Patented Feb. 5, 1952

2,584,539

UNITED STATES PATENT OFFICE 2,584,539

REACTION OF LIMONENE WITH CARBON MONOXIDE AND HYDROGEN

Carl Bordenca and Wilbur Arthur Lazier, Birmingham, Ala., assignors to Food Machinery and Chemical Corporation, a corporation of Delaware No Drawing. Application July 20, 1946, Serial No. 685,241

3 Claims. (Cl. 260—598)

This invention relates to new butyraldehyde derivatives and more specifically refers to beta-(4-methyl-$\Delta^3$ cyclohexenyl)-butyraldehyde and beta-(4-methyl cyclohexyl) butyraldehyde and processes for the production thereof.

It is known that carbonyl compounds may be prepared by reacting aliphatic or cyclic olefines with carbon monoxide and hydrogen in the presence of suitable hydrogenation catalysts at suitable temperatures and under suitable pressures. The broad principles of this reaction are disclosed in Roelen Patent No. 2,327,066, issued August 17, 1943, and entitled "Production of Oxygenated Carbon Compounds." According to the instructions of this patent, any aliphatic or cyclic olefine may be converted to a carbonyl compound by reacting it with carbon monoxide and hydrogen in the presence of hydrogenating catalysts. Numerous well-known hydrogenating catalysts are described as suitable for this purpose. Any temperature within the range of 50° C. to 200° C., and any pressure from 1 to about 50 atmospheres are indicated as suitable for this purpose. The time of the reaction is stated to vary between a few seconds and several hours. The patent teaches further that by increasing the pressure, the reaction temperature may be reduced. Several olefines of an aliphatic or a cyclic nature, including limonene or pinene, are described.

Significantly, however, this patent fails to state the precise nature of the products which would be obtained by the described reaction other than the general expression that they are ketones or aldehydes—or even alcohols, where temperatures above 120–140° C. are employed. Since innumerable compounds are embraced within the ambit of this general prediction, it appears that the patent is more an invitation to experiment than an unequivocal disclosure which will permit one skilled in the art to produce from a given olefine a desired aldehyde or a desired ketone. For instance, in the case of limonene there could be, theoretically, an aldehyde group in one or more of four positions in the molecule. Also, there might be dextro or levo-rotation of the compounds, or they might be optically inactive. And finally, there could be a variety of ketone derivatives, all within the general description referred to previously.

The multiplicity of possible reaction products is best demonstrated by reference to the following structural formula for limonene:

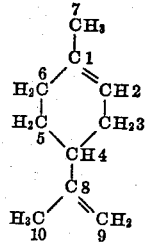

If one molecule of carbon monoxide were to be added at one of the double bonds, it could theoretically enter at any one of four positions, designated by the numbers 1, 2, 8, and 9. Thus, there are four possible derived mono-aldehydes. If a second carbon monoxide molecule were to enter the limonene molecule, there could theoretically be four dialdehydes. Consideration of possible partial hydrogenation of these aldehydes with the formation of monohydric alcohols, glycols, and hydroxy aldehydes adds still further to the confusing complexity of this reaction system. Furthermore, each of the above mentioned compounds could be dextro-rotatory, levorotatory, or optically inactive, depending upon the nature of the limonene used as starting material.

That the Roelen patent is essentially an invitation to experiment is borne out by attempts to follow its instructions and determine what, if any, carbonylic compounds are produced. In these attempts, limonene was used as the olefinic material. Various hydrogenating catalysts, described in the patent, were employed to bring about the predicted reaction between the olefine, carbon monoxide, and hydrogen. Temperatures as high as 150° C. and pressures ranging from 1000 to 2000 pounds per square inch were employed. According to the teachings of the patent, this should have resulted in the production of either aldehyes or ketones, yet no appreciable quantities of these compounds were produced, and in fact when any reaction ensued at all, the principal product was an intractable tar. It became apparent from these experiments that in order to convert limonene to a carbonylic derivative by reaction with carbon monoxide and hydrogen, catalysts not even hinted at in the Roelen patent would be necessary.

It is an object of this invention to produce aldehydes from limonene by suitable reaction with carbon monoxide and hydrogen. It is a further object to produce new limonene derivatives wherein but a single aldehyde group is introduced into the molecule, and that at the terminal carbon atom in the aliphatic side chain rather than in the ring portion thereof. A still further object is to produce beta-(4-methyl-$\Delta^3$-cyclohexenyl) butyraldehyde and beta-(4-methyl cyclohexyl) butyraldehyde. A still further object is to produce the foregoing compounds in each of their optically-active forms, as well as their optically inactive forms. An additional object is to produce the foregoing compounds by a process which is simple and efficient. Additional objects will become apparent from a consideration of the following description and claims.

We have now found in accordance with the present invention that two pure beta-substituted butyraldehydes can be produced in a high state of purity by reacting limonene with carbon monoxide and hydrogen in the presence of specially prepared cobalt catalysts different from those disclosed in the Roelen patent. These specific catalysts are prepared by the Raney process which consists of extracting with aqueous alkali the aluminum from a finely powdered cobalt-aluminum alloy. When using the residual cobalt as catalyst in the limonene-carbon monoxide-hydrogen condensation reaction at a temperature of 130 to 175° C., and a pressure at the reaction temperature of from 1000 to 5000 pounds per square inch, the reaction may be completed in from 0.5 to 3 hours. At lower temperatures, the reaction may require much longer, for example, up to 10 hours. In contrast with this favorable result, no absorption of hydrogen or carbon monoxide took place when iron or nickel catalysts were used. Indeed, when a cobalt-thoria catalyst recommended in the examples of the Roelen patent, was tried, the carbonyl compounds formed consisted of a multiplicity of unidentified products having a disagreeable odor entirely unlike the aldehydes of this invention (see Example 6). By applying our improved process to dextrorotatory limonene the corresponding dextrorotatory aldehydes are produced wherein the aldehyde groups are attached to the terminal carbon atom in the aliphatic side chain of the molecule. In the same manner, by employing levorotatory limonene or optically inactive limonene, the corresponding levorotatory or optically inactive butyraldehyde derivatives of limonene may be obtained.

The invention may be more readily understood by a consideration of the following illustrative examples.

Example 1

A high-pressure hydrogenation bomb of 685 cc. capacity was charged with 168 grams of d-limonene and 1 gram of Raney cobalt catalyst prepared from a 50-50 cobalt-aluminum alloy. Carbon monoxide was introduced to a pressure of 650 lbs./sq. in. (28° C.) and then hydrogen to a total pressure of 1200 lbs./sq. in. Agitation was begun, and the temperature was raised to 150° C., at which temperature the pressure dropped from 1870 lbs./sq. in. to 600 lbs./sq. in. in 3 hours. The product was filtered and then subjected to fractional distillation. Forty grams of beta-(4-methyl-$\Delta^3$-cyclohexenyl) butyraldehyde ($C_{11}H_{18}O$) was collected: B. P. 72–74° C./ 1 mm.; $n_D^{27}$—1.477; $[\alpha]_D^{27}$+15.3. The positive rotation indicated that this product was dextrorotatory. It gave all characteristic reactions of aldehydes, such as the Schiff test and solubility in saturated sodium bisulfite. It was converted to its semi-carbazone, M. P. 148–149° C. Analysis of the semi-carbazone gave: carbon, 64.0%; hydrogen, 9.6%. Calculated for $C_{12}H_{21}ON_3$: carbon, 64.6%, hydrogen, 9.4%. The structure of the aldehyde was proved by oxidation with silver oxide to the corresponding acid, followed by dehydrogenation to beta-p-tolylbutyric acid, M. P. 89–90° C. Its p-toluide derivative had M. P. 108–110° C.

Example 2

In an experiment similar to Example 1, 250 grams of d-limonene and 2 grams of Raney cobalt catalyst were charged into a pressure-resistant reaction tube of 2240 cc. capacity. Carbon monoxide was introduced to a pressure of 1510 lbs./sq. in. (28° C.) and hydrogen was added to a total of 3000 lbs./sq. in. At 150° C., the pressure dropped from 4330 lbs./sq. in. to 3360 lbs./sq. in. in three hours. After distilling off a forerun of partially hydrogenated limonene (consisting for the most part of 8,9-dihydro-limonene), a middle fraction of 11 grams of material boiling sharply at 55–56°/1 mm. ($n_D^{28}$—1.468; $[\alpha]_D^{28}$+28) and finally 100 grams (33% yield) of beta-(4-methyl-$\Delta^3$-cyclohexenyl) - butyraldehyde were collected. This latter product gave $n_D^{28}$—1.476; $[\alpha]_D^{28}$+40.0. Analysis: found: C, 78.93%; H, 11.31%. Calculated for $C_{11}H_{18}O$: C, 79.46%; H, 10.91%. Its diethyl acetal derivative, B. P. 84° C./1–2 mm. $n_D^{27}$—1.456, gave on analysis C, 74.20%; H, 11.62%. Calculated for $C_{15}H_{28}O_2$: C, 74.95%; H, 11.74%. Upon reduction of this acetal over platinum at two atmospheres, one mol. of hydrogen was absorbed, resulting in the formation of the diethyl acetal of beta-(4-methyl-cyclohexyl) butyraldehyde, B. P. 85°/1–2 mm. $n_D^{28}$—1.447. Analysis: found: C, 74.04%; H, 12.02%. Calculated for $C_{15}H_{30}O_2$: C, 74.32%; H, 12.48%.

Upon regeneration of beta-(4-methyl-cyclohexyl) butyraldehyde from its acetal, it was found to have the following constants: B. P. 58–59° C./1 mm; $n_D^{28}$—1.465.

The sharp middle fraction that preceded the beta - (4-methyl-$\Delta^3$-cyclohexenyl) - butyraldehyde gave the following analysis: found: C, 78.82%; H, 11.41%. Calculated for $C_{11}H_{20}O$: C, 78.51%; H, 11.98%.

It was converted to its diethyl acetal derivative, which had B. P. 84°/1–2 mm. and $n_D^{28}$—1.448. Thus, it was identical with the diethyl acetal of beta-(4-methyl-cyclohexyl) butyraldehyde, and therefore this aldehyde was formed in the reaction as a secondary product by hydrogenation of the unsaturated aldehyde which was first formed by the interaction of 1 mol. of limonene, 1 mol. of carbon monoxide, and 1 mol. of hydrogen. Comparison of ultra-violet absorption spectra curves for the two aldehydes and the acetal derivatives confirmed this finding.

Example 3

An ultra-fine, easily suspensible cobalt catalyst was prepared from an alloy containing 70% aluminum and 30% cobalt. This alloy was ground to a 200-mesh powder and treated with excess alkali to remove the aluminum. The remaining finely divided cobalt was washed with distilled water until entirely neutral. The water was then displaced by several washings with absolute methanol, and the catalyst used directly in the following experiment:

A high-pressure reactor of 685 cc. capacity was charged with 150 grams of d-limonene and 3 grams of the above catalyst. Carbon monoxide was introduced to a pressure of 1500 lbs./sq. in. and hydrogen to a total of 2710 lbs./sq. in. (28° C.). Shaking was begun, and the temperature was raised to 140° C., at which the pressure dropped from 3700 lbs./sq. in. to 1500 lbs./sq. in. in three hours. During this time a maximum absorption rate of 657 lbs./sq. in. (corrected to 26° C.) per hour was observed. The product was filtered and fractionally distilled. Ten grams of beta-(4-methyl cyclohexyl) butyraldehyde, $n_D^{28}$—1.469, $[\alpha]_D^{28}$+24.3°, and 45 grams (25% yield) of beta-(4-methyl-$\Delta^3$-cyclohexenyl)-butyraldehyde, B. P. 77–79° C./2 mm., $n_D^{28}$—1.478, $[\alpha]_D^{28}$+35° were collected.

Example 4

In an experiment similar to Example 1, a high-pressure reactor of 2240 cc. capacity was charged with 250 grams of dipentene (purified by fractional distillation of commercial dipentene) and 2 grams of Raney cobalt catalyst. Carbon monoxide to 820 lbs./sq. in. (23° C.) and then hydrogen to a total of 1320 lbs./sq. in. were introduced. The mixture was shaken at 150° C. for 10 hours, during which the pressure dropped from 1940 lbs./sq. in. to 1320 lbs./sq. in. On fractional distillation, 15 grams of optically inactive beta-(4-methyl cyclohexyl) butyraldehyde, B. P. 59–65° C./1–2 mm., $n_D^{28}$—1.465, and 53 grams of optically inactive beta-(4-methyl-$\Delta^3$-cyclohexenyl) butyraldehyde, B. P. 70–75° C./1–2 mm., $n_D^{26}$—1.475 were obtained.

Example 5

By substituting l-limonene for the dl-limonene (dipentene), employed in Example 4, the corresponding levorotatory aldehyde and saturated aldehyde derivatives of limonene could be obtained.

Example 6

The hydrogenation bomb described in Example 1 was charged with 150 grams of d-limonene and 10 grams of a standard cobalt-thoria-on-kieselguhr catalyst (containing approximately 100 parts kieselguhr, 100 parts cobalt, and 18 parts thorium oxide). Carbon monoxide was introduced to 1370 lbs./sq. in. and hydrogen to a total of 2750 lbs./sq. in. At 100 to 110° C., no reaction took place, but when the temperature was raised to 135° C., absorption was extremely fast. The pressure dropped from 3750 lbs./sq. in. to 1210 lbs./sq. in. at this temperature in approximately 30 minutes. This absorption was far in excess of the requirement for normal reaction. The product could be distilled only with difficulty, due to apparent decomposition, and much tarry black residue (amounting to more than two-thirds of the weight of the charge) remained. Only 13 grams of an unidentified mixture were collected. This mixture could not be separated into its individual components, and had a disagreeable odor rendering it worthless for use as a perfume ingredient.

For optimum results it has been found that the process of the present invention employing Raney cobalt as the catalyst should be carried out at a temperature of from 130–175° C. Higher temperatures may be employed, but they increase the formation of polymers and by-products. The time of the reaction will vary from about 0.5 to about 10 hours, but in general a time of approximately 2 or 3 hours at a temperature of 150° C., is sufficient. It has been found that, contrary to the instructions of the foregoing Roelen patent, higher pressures do not permit the employment of appreciably lower temperatures, but rather, tend to improve the yield. For instance, at a working pressure of 1870 lbs./sq. in and a temperature of 150° C., 20% conversion was obtained in 3 hours, whereas an increase in this pressure to 4330 lbs./sq. in. increased the yield of the desired products to at least 35%, the same temperature being employed. In the same manner, at a working pressure of 3700 lbs./sq. in. and a reaction temperature of 125° C., the rate of the reaction was found to be approximately one-tenth of the normal rate which occurred at the same pressure and the temperature of 150° C.

The condensation products of this reaction have been found to have the following structures:

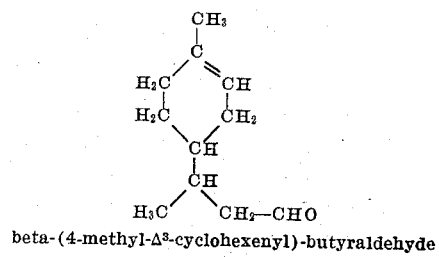

beta-(4-methyl-$\Delta^3$-cyclohexenyl)-butyraldehyde

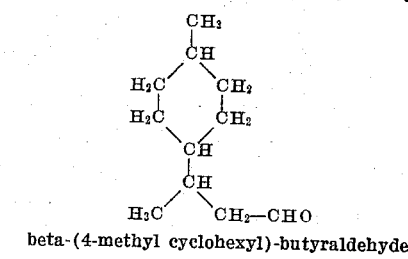

beta-(4-methyl cyclohexyl)-butyraldehyde (I) is usually found in the greater amount and may be regarded as the primary reaction product. (II) boils at a very slightly lower temperature than (I) and may be separated from it by careful fractional distillation. The saturated compound (II) and the unsaturated compound (I) are distinguished most readily by their different refractive indices and characteristic ultra-violet absorption spectra. The saturated aldehyde (II) transmits ultra-violet light having a wave length of 2360 A. more readily than the unsaturated aldehyde (I).

The structure of (I) has been established by two independent methods. In the first method the aldehyde was dehydrogenated and the resulting aromatic product oxidized by chromic acid-sulfuric acid mixture to terephthalic acid, which was identified by its decomposition point and by the melting point of its dimethyl ester. In the second method, the unsaturated aldehyde was identified by oxidizing it to the corresponding acid and thereafter dehydrogenating this acid to produce curcumic acid (beta-p-tolylbutyric acid), a known crystalline compound.

In order to establish the correct structural relationship of (II) to (I), both compounds were converted to their corresponding acetals which were subjected to catalytic hydrogenation over a platinum catalyst. In the case of the acetal of (II), no hydrogen was absorbed and the index of refraction remained constant. In the case of the acetal of (I), one mol. of hydrogen was absorbed and the index of refraction became the same as that of the acetal of (II). Thus, the acetal of compound (I) had been converted by hydrogenation into the acetal of compound (II). Regeneration of the hydrogenated acetal from (I) gave an aldehyde identical with (II).

Both (I) and (II) can exist in three optically different but chemically identical forms, i. e. dextrorotatory, levorotatory, and the racemic or optically inactive form, depending on the optical form of the limonene employed. By adjusting the synthesis conditions, the ratio of the formation of the saturated and unsaturated aldehydes can also be varied. All of these aldehydes are members of a new class of perfume chemicals having the structure.

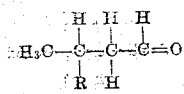

in which R is an alkyl-substituted non-benzenoid cyclic hydrocarbon group.

The products of this invention are of value as intermediates. In particular, they have been found to be useful for application in compounding perfumes. They have a pleasant odor which has been found to be remarkably persistent, and they blend well with the usual ingredients used in perfume. For this purpose, they have a wide variety of applications and may be employed in admixture with, or as a substitute for, hydroxy citronellal in blended perfumes.

As many apparently widely different embodiments of this invention may be made without departing from the spirit and scope hereof, it is to be understood that the invention is not limited to the specific embodiments hereof except as defined in the appended claims.

We claim:

1. A process which comprises reacting limonene with carbon monoxide and hydrogen in the presence of Raney cobalt at a temperature of approximately 130–175° C., a pressure at the reaction temperature of from 1000 to 5000 pounds per square inch, and for a time within the range of 0.5 to 10 hours.

2. A process which comprises reacting d-limonene with carbon monoxide and hydrogen in the presence of Raney cobalt at a temperature of approximately 130–175° C., a pressure at the reaction temperature of from 1000 to 5000 pounds per square inch, and for a time within the range of 2 to 10 hours.

3. A process which comprises reacting di-limonene with carbon monoxide and hydrogen in the presence of Raney cobalt at a temperature of approximately 130–175° C., a pressure at the reaction temperature of from 1000 to 5000 pounds per square inch, and for a time within the range of 2 to 10 hours.

CARL BORDENCA.
WILBUR ARTHUR LAZIER.

REFERENCES CITED

The following references are of record in the file of this patent:

UNITED STATES PATENTS

| Number | Name | Date |
| --- | --- | --- |
| 1,873,430 | Knorr et al. | Aug. 23, 1932 |
| 2,327,066 | Roelen | Aug. 17, 1943 |
| 2,437,600 | Gresham et al. | Mar. 9, 1948 |

FOREIGN PATENTS

| Number | Country | Date |
| --- | --- | --- |
| 507,204 | Great Britain | June 7, 1939 |

OTHER REFERENCES

Faucounau: Bull. Soc. Chim. Tome 4 (1937), pages 63–67, 5 pages.

Du Pont et al.: Bull. Soc. Chim. Tome 6 (1939), pages 326–329, 4 pages.